Jan. 30, 1951  R. E. LJUNGKULL  2,539,545
CLUTCH AND BRAKE MECHANISM
Filed Dec. 11, 1944  6 Sheets-Sheet 1

INVENTOR.
ROLF E. LJUNGKULL
BY
G. H. Braddock
ATTORNEY

Jan. 30, 1951 R. E. LJUNGKULL 2,539,545
CLUTCH AND BRAKE MECHANISM
Filed Dec. 11, 1944 6 Sheets-Sheet 4

INVENTOR.
ROLF E. LJUNGKULL
BY
G. H. Braddock
ATTORNEY

Jan. 30, 1951  R. E. LJUNGKULL  2,539,545
CLUTCH AND BRAKE MECHANISM

Filed Dec. 11, 1944  6 Sheets-Sheet 5

INVENTOR.
ROLF E. LJUNGKULL
BY
G. H. Braddock
ATTORNEY

Patented Jan. 30, 1951

2,539,545

UNITED STATES PATENT OFFICE 2,539,545

CLUTCH AND BRAKE MECHANISM

Rolf E. Ljungkull, St. Paul, Minn., assignor to American Hoist & Derrick Co., St. Paul, Minn., a corporation of Delaware Application December 11, 1944, Serial No. 567,705

11 Claims. (Cl. 192—17)

This invention has relation to a material handling apparatus of the type including a drum with cable for hoisting and/or other purposes.

An object of the invention is to provide a material handling apparatus which will include a drum to be rotated to cause a load to be moved, as, for example, hoisted, and a novel and improved construction and arrangement for causing the drum to be operated and controlled.

A further object is to provide a material handling apparatus constituted as a hoist having a drum to be rotated which will include mechanisms for driving and braking the drum, new and improved devices adapted to be actuated to control said mechanisms, and means at a single location adapted to be manipulated to cause the devices selectively to be actuated.

A further object is to provide a material handling apparatus which will include a drum to be rotated, mechanism for driving and braking the drum, devices adapted to be actuated to control the mechanisms, and a unitary means adapted to be manipulated to cause the devices selectively to be actuated.

A further object is to provide a material handling apparatus constituted as a hoist having a drum to be rotated which will include mechanisms for driving and for braking the drum and for retaining said drum in stationary position against the weight of a load, and a novel and improved construction and arrangement for controlling the drum driving, braking and retaining mechanisms thus to control operation, braking and retention of said drum.

A further object is to provide a material handling apparatus which will include a combination drum braking and clutching mechanism of novel and improved construction.

A further object is to provide a material handling apparatus wherein will be incorporated various improved features and characteristics of construction novel both as individual entities of the material handling apparatus and in combination with each other.

And a further object is to provide a material handling apparatus which will incorporate features and characteristics of construction as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification.

With respect to the drawings and the numerals of reference thereon, 15 denotes a base structure of the material handling apparatus which supports spaced apart, upstanding bearing members 16, 16 situated at opposite sides of the base structure.

A horizontal drum shaft 17 is rotatably mounted in spaced apart bearings 18, 18 provided by the bearing members 16, 16, and said drum shaft 17 has an extension portion 19 situated at the outer side of one of the bearings 18.

A horizontal shaft 20, in spaced, parallel relation to and at a side of the drum shaft 17, is rotatably mounted in spaced apart bearings 21, 21 provided by said bearing members 16, 16.

An electric motor 22, in spaced, parallel relation to said drum shaft 17 and at the side of the drum shaft opposite the horizontal shaft 20, is suitably and conveniently supported upon the base structure 15.

Operation of the electric motor 22 is adapted to cause the drum shaft 17 to be rotated through the instrumentality of a drive ratchet-belt 23 upon a ratchet-pulley 24 fixed to the driven shaft of said electric motor and also upon a ratchet-pulley 25 fixed to an extension of the horizontal shaft 20 at the side of the apparatus adjacent the electric motor shaft, and a pinion 26 fixed to an extension of said horizontal shaft 20 at the side of said apparatus adjacent the extension portion 19 which meshes with a gear 27 fixed to said extension portion 19.

A drum 28 of the material handling apparatus is situated upon the drum shaft 17 and is disposed between the bearings 18, 18. As disclosed, the drum 28 includes a hollow cylindrical portion 29 in spaced, surrounding relation to the horizontal drum shaft 17, and also includes hollow hubs, denoted 30 and 31, respectively, integral with and at the opposite ends of said hollow cylindrical portion 29. A bearing housing 32, within and rigid with the hollow hub 30, is rotatably supported upon the drum shaft 17 through the instrumentality of a bearing 33, and a bearing housing 34, within and rigid with the hollow hub 31, is rotatably supported upon said drum shaft 17 through the instrumentality of a bearing 35. The construction and arrangement are such that the drum 28, while free to rotate upon the drum shaft 17, is fixed against movement longitudinally of said drum shaft. A pipe spacer within the drum and in spaced, surrounding relation to the drum shaft is denoted 36. As shown, the pipe spacer 36 extends between the hollow hub 30 and the bearing housing 34. Additionally, the drum 28 includes annular flange members, designated 37 and 38, respectively, which are integral with and extend outwardly from the opposite ends of the hollow cylindrical portion 29 and are in perpendicular relation to the drum shaft 17. The annular flange member 37 integrally supports a cylindrical clutch drum 39 which is at the outer side of said annular flange member 37 and is concentric to the drum shaft 17, and the annular flange member 38 integrally supports a cylindrical clutch drum 40 which is at the outer side of said annular flange member 38 and is concentric to said drum shaft 17. The periphery of the annular flange member 38 is disposed exteriorly of the cylindrical clutch drum 40 and is serrated, thus to be constituted as a ratchet or toothed entity 41.

A clutch entity 42 of the material handling apparatus, splined at 43 to the drum shaft 17, is situated at the outer side of the cylindrical clutch drum 40, between said cylindrical clutch drum and the adjacent bearing 18. An adjustable clutch band 44, in surrounding relation to the clutch drum 40 and adapted to be gripped to and released from said clutch drum 40, has one of its ends 45 secured, as at 46, to the clutch entity 42 and its other end 47 secured, as at 48, to an arm 49 of a clutch crank 50. Said clutch crank 50 is constituted as the arm 49, a stud 51 rigid with said arm 49 and rotatably mounted in a bracket 52 upon the clutch entity 42 and an arm 53 rigid with said stud 51. An actuator lever for the clutch crank 50 is represented at 54. One end of said actuator lever 54 is rotatably supported upon the stud 51, and the other end of the actuator lever is pivotally connected, at 55, to a reach rod 56 which extends out of and away from a chambered housing 57. A spring supporting rod 58 slidably mounted in the bracket 52 has one of its ends 59 pivotally connected to an intermediate portion of the arm 53 of the clutch crank 50, and the opposite end of said spring supporting rod 58 fixedly carries a nut held collar 60. A compression spring 61 upon the rod 58, between the bracket 52 and the collar 60, resiliently urges said arm 53 of the clutch crank toward the actuator lever 54. An adjusting screw 62 in the free end of the arm 53 and engaged with an intermediate portion of said actuator lever 54 is for accomplishing initial adjustment of the clutch band 44 in a manner which will be obvious. The chambered housing 57 is rigidly supported, as at 63, upon the clutch entity 42, and an air conveying connection 64 leads interiorly along the drum shaft 17 into said chambered housing 57. The chambered housing 57 is commonly known in the art as a "brake chamber." An element (not shown) within said chambered housing 57 is adapted to be actuated in response to pressure of air, by way of the air connection 64, to cause the reach rod 56 to be moved outwardly, thus to cause the actuator lever 54 and the clutch crank 50 to be operated against resilient action of the compression spring 61 to actuate the clutch band 44 into gripping relation with the clutch drum 40, and said compression spring 61 is adapted to react upon relief of pressure within the chambered housing 57 to cause said clutch band to release said clutch drum.

A swivel joint upon the end of the drum shaft 17 adjacent the gear 27 is for the purpose of conveying air under pressure to the air connection 64, whence the air will pass to the chambered housing 57. As shown, the swivel joint includes a cup-shape body 65 in surrounding relation to a reduced portion of said drum shaft 17, a gland 66 upon said reduced portion and in closing relation to said cup-shape body, and a tubular bushing 67 and packing 68 within the cup-shape body and surrounding the reduced portion of the drum shaft. The construction and arrangement are such that the drum shaft 17 is freely rotatable within the swivel joint. A collar upon the end of said drum shaft is denoted 69, and an annular, inwardly extending flange upon the cup-shape body 65 and riding the tubular bushing 67 is represented 70. Longitudinal movement of the swivel joint is restricted through the bushing 67, the packing 68 and the gland 66. The cup-shape body 65 provides a chamber 71 within the swivel joint in surrounding relation to the end of the drum shaft, an air connection 72 leads to the chamber 71, and the air connection 64 leads from said chamber 71. Air pressure inside the cup-shape body 65 serves to keep the swivel joint tight.

A brake wheel 73 of the material handling apparatus, having a hub 74 supported upon the hollow hub 30 in such manner that the drum 28 can be rotatable within the brake wheel, is situated at the outer side of the cylindrical clutch drum 39, between said cylindrical clutch drum 39 and the adjacent bearing 18. The periphery of the brake wheel 73 integrally supports a brake ring 75 which is in spaced, surrounding, concentric relation to the clutch drum 39.

An adjustable main or load brake band 76, in surrounding relation to the brake ring 75 and adapted to be gripped to and released from said brake ring, has one of it sends 77 secured, as at 78, to the base structure 15 and its other end 79 secured, as at 80, to an arm 81 of a brake crank 82. Said brake crank 82 is constituted as the arm 81, a brake shaft 83 rigid with said arm 81 and rotatably mounted upon the base structure 15 and an arm 84 rigid with said brake shaft 83. An intermediate portion of the arm 84 is pivotally connected, as at 85, to a reach rod 86 which extends out of and away from a chambered housing 87. The chambered housing 87 is rigidly supported, as at 88, upon the base structure 15, and an air conveying connection 89 leads to said chambered housing 87. The chambered housing 87 is similar to the chambered housing 57 and contains an element (not shown) adapted to be actuated in response to pressure of air, by way of the air connection 89, to cause the reach rod 86 to be moved outwardly. A spring supporting rod 90 slidably mounted, at 91, in the base structure 15 has one of its ends pivotally connected, at 92, to the outer end of the arm 84 of the brake crank 82, and the opposite end of said spring supporting rod 90 fixedly carries a nut held collar 93. A strong compression spring 94 upon the rod 90, between the base structure 15 and the collar 93, resiliently urges said arm 84 of the brake crank 82 toward the chambered housing 87. The construction and arrangement will be such that the strong compression spring 94 normally will retain the brake crank 82 in position to hold the main brake band 76 in gripping relation to the brake ring 75 and that actuation of the reach rod 86 in response to pressure of air within the chambered housing 87 will cause said brake crank 82 to be actuated to causes said main brake band to be released from said brake ring. Actuation of the reach rod 86 to release the main brake band of course will be against resilient action of the strong compression spring 94, and said strong compression spring is adapted to react upon relief of pressure within the chambered housing 87 to cause said main brake band to be gripped against said brake ring.

An adjustable differential clutch band 95, in surrounding relation to the clutch drum 39 and adapted to be gripped to and released from said clutch drum 39, has one of its ends 96 secured, as at 97, to an arm 98 of a crank 99 and its other end 100 secured, as at 101, to an arm 102 of said crank 99. The crank 99 is constituted as said arms 98 and 102 and a spindle 103 rigid with said arms and rotatably mounted, as at 104, upon the brake wheel 73.

The hollow hub 30 of the drum 28 supports clutch shoes, denoted 105 and 106, respectively, which are frictionally held against said hollow hub 30. In the disclosure as made, each clutch shoe 105, 106 is of part-circular configuration, and ends of the clutch shoes at one side of the hollow hub 30 are pivotally connected, as at 107. Said clutch shoes 105 and 106 are adjustably connected to each other at the side of said hollow hub 30 opposite the pivotal connection 107 by a headed and nutted bolt 108, and a small compression spring 109 upon said tie bolt resiliently urges said clutch shoes 105, 106 toward each other and against the hollow hub 30 in such manner as to permit movement of rotation of said hollow hub within the clutch shoes but to cause said clutch shoes to be frictionally engaged against the hollow hub so that there will be tendency toward movement of rotation of the clutch shoes in the same direction as said hollow hub when the hollow hub is rotated. The outer end of an extension 110 of the clutch shoe 106, disposed perpendicularly of the hollow hub 30, is pivotally connected, as at 111, to a link 112 which is at substantially right angle relation to said extension 110. The opposite end of the link 112 is pivotally connected, as at 101, to the outer end of the arm 102.

Figure 1:
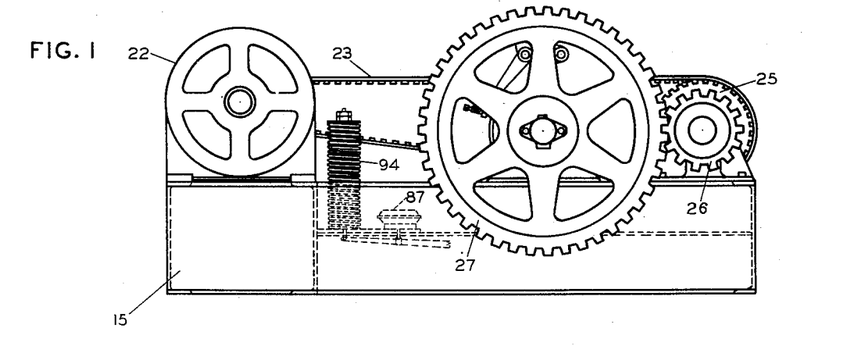
Fig. 1 is a side elevational view of a material handling apparatus made according to the invention.
Figure 2:
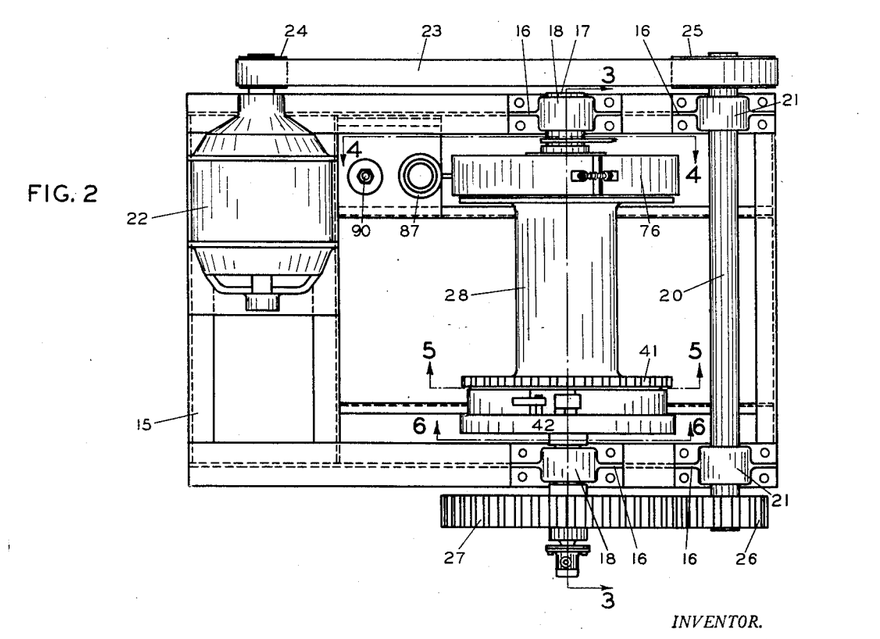
Fig. 2 is a top plan view of the material handling apparatus of Fig. 1.
Figure 3:
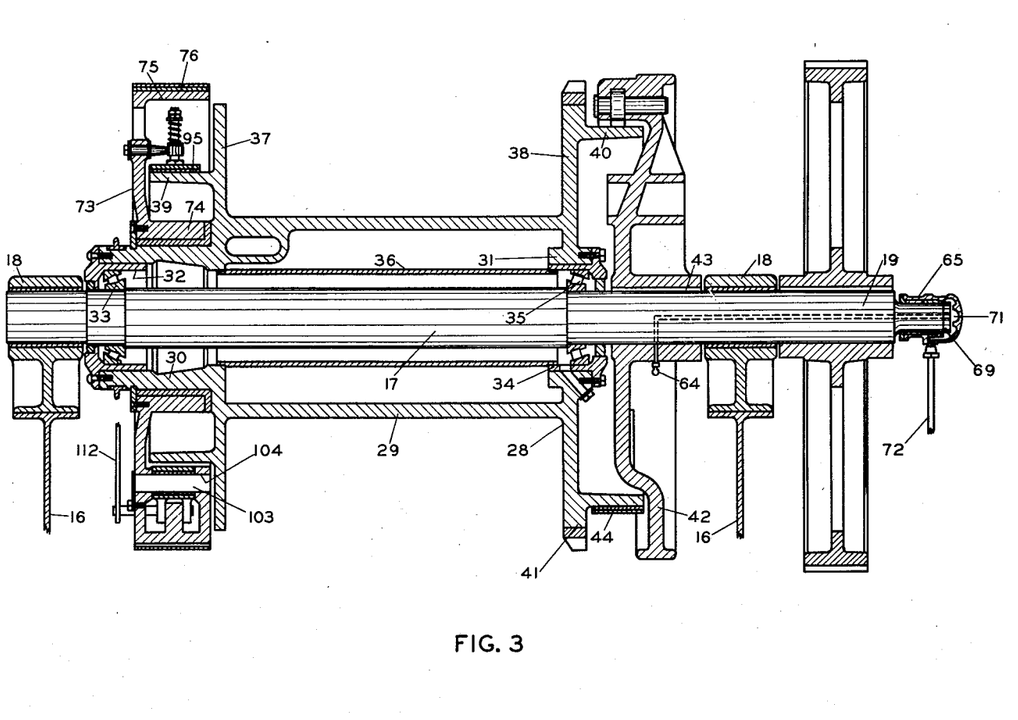
Fig. 3 is a detail sectional view, taken on line 3—3 in Fig. 2.
Figure 4:
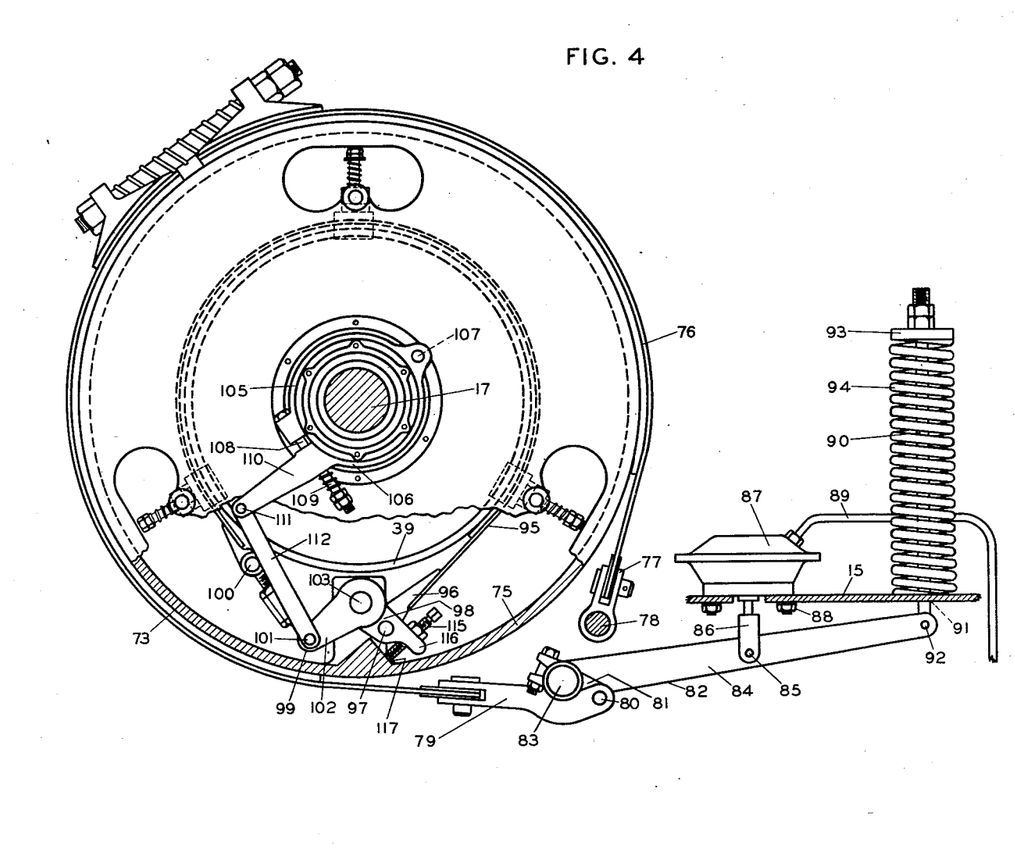
Fig. 4 is a detail sectional view, taken on line 4—4 in Fig. 2.
Figures 5, 8, 9, 10, 11:
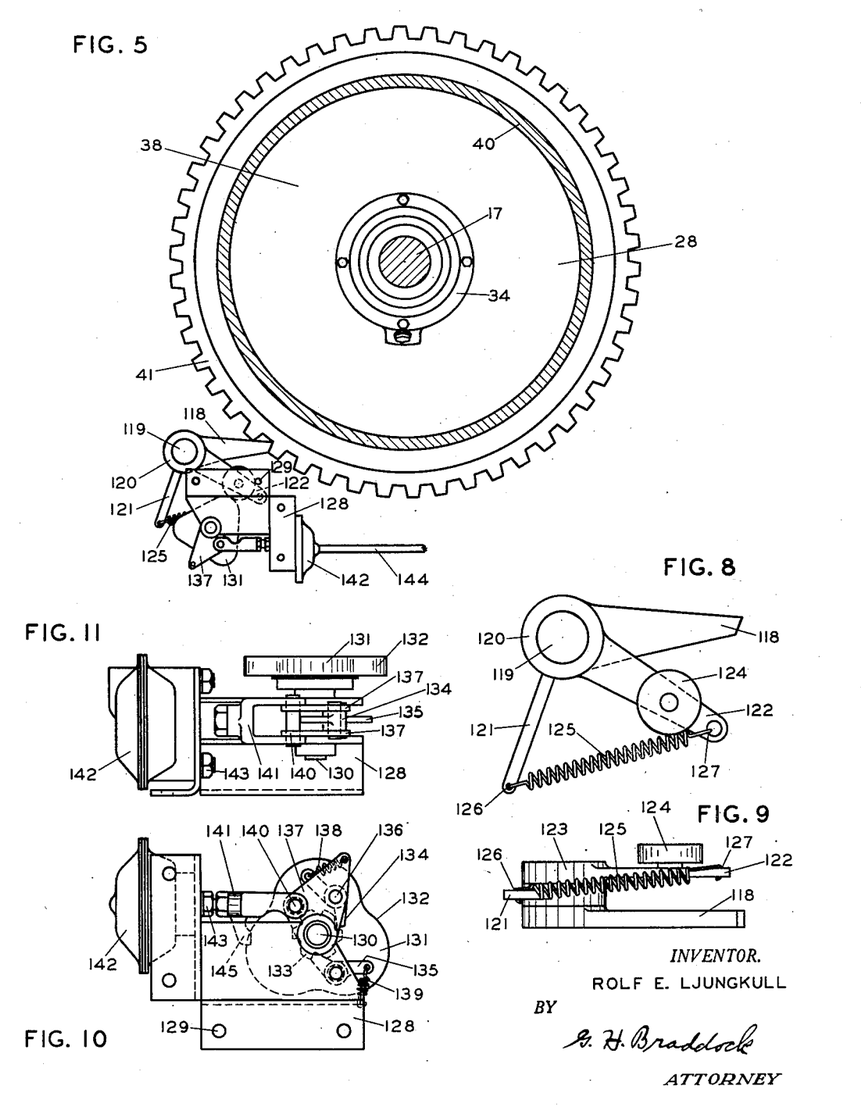
Fig. 5 is a detail sectional view, taken on line 5—5 in Fig. 2.
Fig. 8 is an enlarged elevational view of a dog assembly of said material handling apparatus.
Fig. 9 is a bottom plan view of the disclosure of Fig. 8.
Fig. 10 is an enlarged elevational view of a dog shifter assembly of the material handling apparatus.
Fig. 11 is a top plan view of the disclosure of Fig. 10, parts being omitted.
Figure 6:
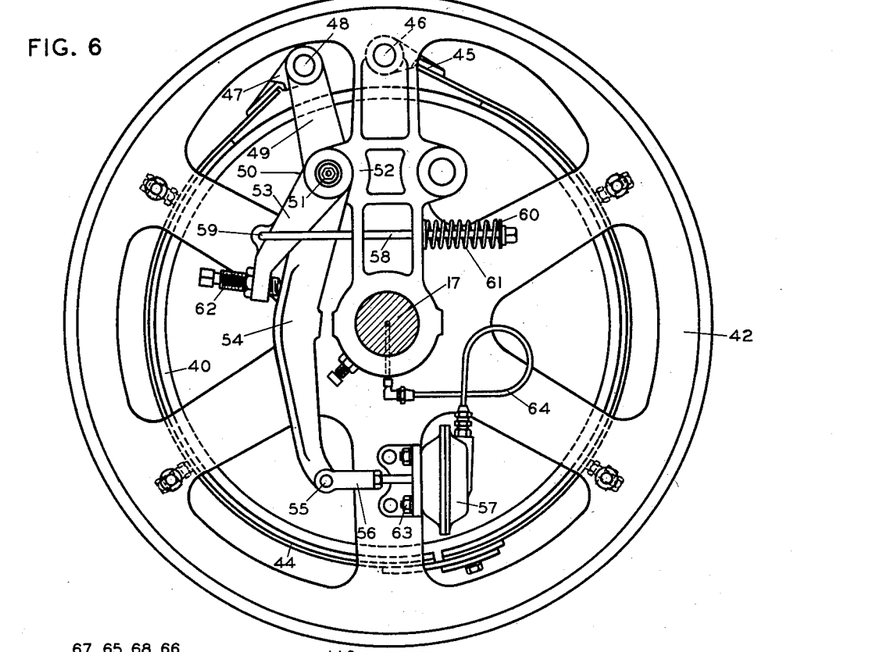
Fig. 6 is a detail sectional view, taken on line 6—6 in Fig. 2.

As will be noted in Figs. 3 and 4 of the drawings, the spindle 103 is situated in spaced relation to the clutch drum 39, and the arms 98 and 102 of the crank 99 are substantially perpendicular to each other and are situated at the side of said spindle opposite said clutch drum 39. It will also be noted in Fig. 4 that the connection 97 is closer to the spindle 103 than is the connection 101. That is to say, the end 96 of the clutch band 95 is secured to the crank 99 at closer relation to said spindle 103 than is the end 100 of said clutch band. Obviously, the differential clutch band 95 will be expanded or lengthened in response to rotary movement of the crank 99 as in said Fig. 4 in clockwise direction and will be contracted or shortened in response to rotary movement of said crank 99 in counterclockwise direction. In practical operation of the material handling apparatus, the construction and arrangement will be such that rotary movement of the drum 28 when lifting or hauling in a load will cause the clutch shoes 105, 106 and the crank 99 as in Fig. 4 to be rotated in clockwise direction thus to cause the differential clutch band 95 to be released from the clutch drum 39 and that commencement of rotary movement of said drum 28 in opposite direction under stress of a load will cause said clutch shoes 105, 106 and said crank 99 as in said Fig. 4 to be rotated in counterclockwise direction thus to cause said differential clutch band 95 to be tightly gripped to and against said clutch drum 39. The longer arm 102 of the crank 99 will evidently apply more tension to the differential clutch band 95 than the shorter arm 98 of said crank will release upon rotation of the crank in counterclockwise direction so that said differential clutch band will be rigidly gripped against the clutch drum 39, and said longer arm 102 will just as evidently place more slack in said differential clutch band than said shorter arm 98 will remove upon rotation of said crank in clockwise direction so that the differential clutch band will be released from said clutch drum.

An adjusting screw 115 in an extension 116 of the arm 98 of the crank 99 and adapted to be engaged against a stop 117 provided by the brake wheel 73 is for the purpose of limiting the extent to which said crank 99 can be rotated in clockwise direction.

The material handling apparatus includes mechanism, constituted as a dog 118 adapted to be engaged with and disengaged from the ratchet or toothed entity 41 integral with the annular flange member 38, for retaining the drum 28 in stationary position against the weight of a load when this is intentional.

The dog 118 is rigid with a stub shaft 119 suitably and conveniently rotatably mounted, as at 120, upon the base structure 15, and said stub shaft 119 rigidly supports an anchor piece 121, constituted as a strip of material, which as shown is at obtuse angle relation to said dog 118. An actuator arm 122, situated between the dog 118 and the anchor piece 121, is rotatably mounted, as at 123, upon the stub shaft 119. A roller 124 is supported upon an intermediate portion of the actuator arm 122, and a tension spring 125 has one of its ends secured, as at 126, to the anchor piece 121 and its other end secured, as at 127, to the end of said actuator arm 122 spaced from the stub shaft 119.

A dog shifter frame 128 is suitably and conveniently supported, as at 129, upon the base structure 15, and a cam shaft 130, rotatably mounted upon said dog shifter frame, fixedly supports a cam 131 having a working surface 132 adapted to be engaged against the roller 124. A ratchet 133 upon the cam shaft 130 is adapted to be advanced through the instrumentality of an actuator pawl 134 and retained at advanced position by a check pawl 135. The actuator pawl 134 is rotatably mounted, as at 136, upon and between actuator plates 137 themselves rotatably supported upon the cam shaft 130. A small tension spring 138, connected to the actuator plates 137 and to the actuator pawl 134, resiliently urges said actuator pawl into engagement with the ratchet 133. The check pawl 135 is rotatably mounted upon the dog shifter frame 128, and a small tension spring 139, connected to said frame 128 and to the check pawl, resiliently urges said check pawl into engagement with said ratchet 133. A portion of each actuator plate 137 spaced from the actuator pawl 134 is pivotally connected, as at 140, to a reach rod 141 which extends out of and away from a chambered housing 142. The chambered housing 142 is rigidly supported, as at 143, upon the dog shifter frame 128, and an air conveying connection 144 leads to said chambered housing 142. The chambered housing 142 is similar to the chambered housings 57 and 87 and contains an element (not shown) adapted to be actuated in response to pressure of air, by way of the air connection 144, to cause the reach rod 141 to be moved outwardly thus to cause the actuator plates 137 and the actuator pawl 134 to be operated to advance the ratchet 133. A stop element 145 upon the reach rod 141 is adapted to be engaged against the cam shaft 130 thus to limit and control the extent to which said ratchet 133, and, hence, the cam 131, is advanced for each outward movement or actuation of said reach rod 141. The construction and arrangement will be such that the reach rod 141 will be returned to normal receded position upon release of pressure within the chambered housing 142, thus to cause the actuator pawl 134 to be returned to normal receded position, as will be obvious.

As disclosed, the cam 131 is of generally triangular shape, and the working surface 132 of said cam includes three apices each of curvilinear configuration and spaced at 120 degrees apart and three flat surfaces between the apices. The construction and arrangement will be such that the roller 124 alternately will be adjacent the apices and flat surfaces of said working surface 132 of the cam 131. Supposing said roller 124 to be adjacent to a flat surface of said cam 131, actuation of the reach rod 141 in response to pressure of air will cause the cam to be advanced to extent causing an apex of said cam to move or swing the roller 124 and the actuator arm 122 toward the dog 118 and away from the anchor piece 121 thus to move or swing said dog 118 into engagement with a tooth of the ratchet 41 under resilient action of the tension spring 125, and supposing the roller 124 to be against an apex of the cam 131, actuation of said reach rod 141 in response to pressure of air will cause said cam to be advanced to extent causing a side of the cam to be adjacent said roller 124 thus to permit the dog 118 to be kicked out and clear of the ratchet or toothed entity 41 in response to slight rotation of the drum 28 in load lifting direction. Stated otherwise, operation of the reach rod 141 in response to air pressure while the dog 118 is released from the ratchet or toothed entity 41 will cause said dog to be set against said ratchet or toothed entity, and operation of said reach rod 141 in response to air pressure while the dog 118 is set against the ratchet or toothed entity will situate the cam 131 in position adapted to permit release of said dog from said ratchet or toothed entity.

Figure 7:
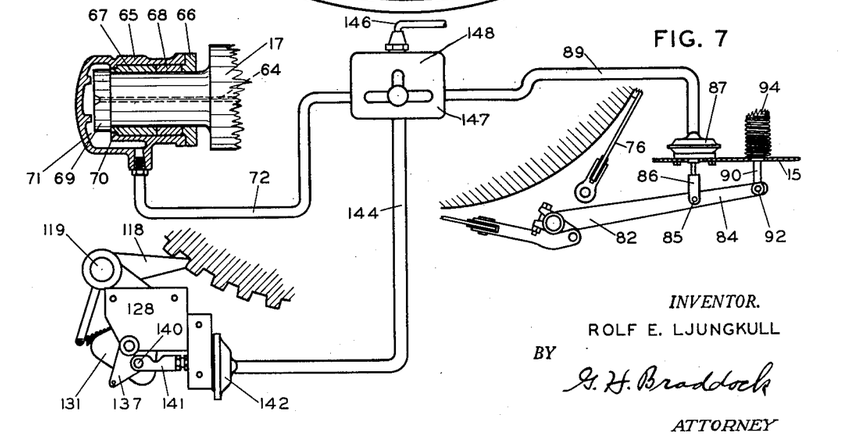
Fig. 7 is a diagrammatic view disclosing an air system of the material handling apparatus.
Figure 12:
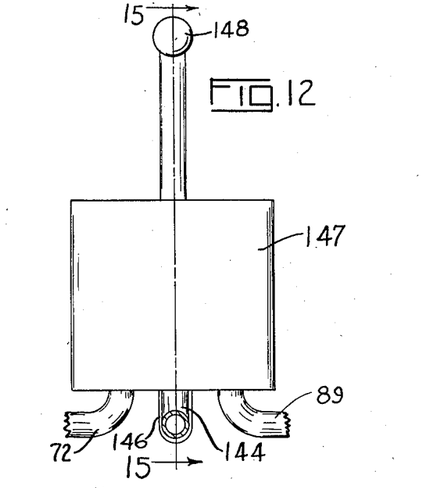
Fig. 12 is a front elevational view of a valve housing of the material handling apparatus.
Figure 13:
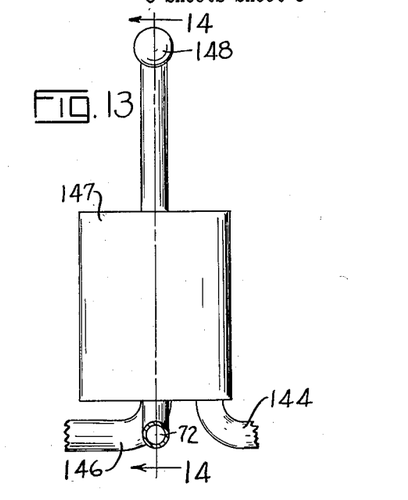
Fig. 13 is a side elevational view of the valve housing of Fig. 12 as it would appear from the left.
Figure 14:
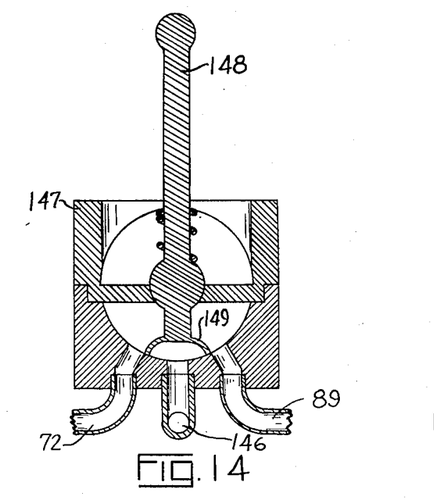
Fig. 14 is a sectional view, taken on line 14—14 in Fig. 13.
Figure 15:
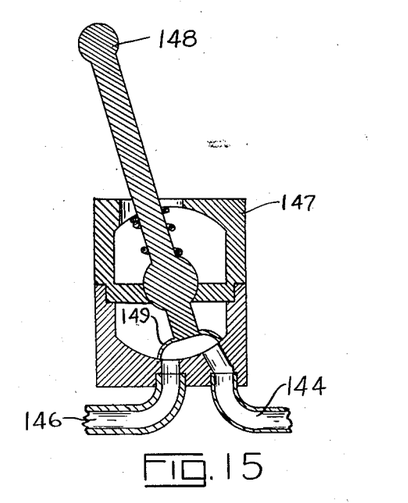
Fig. 15 is a sectional view, taken on line 15—15 in Fig. 12.

An air conveying connection 146 leads from a source (not shown) of air under pressure to a valve housing 147, and each of the air conveying connections 72, 89 and 144 leads from said valve housing. A three-way valve 149 in the valve housing 147, controlled by a manually actuable lever 148, is adapted selectively to control passage of air from the air connection 146 by way of said three-way valve to each of said air connections 72, 89 and 144, respectively. In Figs. 7, 13 and 14 of the drawings, the manually actuable control lever 148 is disclosed in neutral position, or position precluding flow of air from the air connection 146 to each and all of the air connections 72, 89 and 144.

When it is desired that the drum 28 be driven by the electric motor 22, the control lever 148 is operated to position the valve 149 to open the air connection 146 having air under pressure to the air connection 72, thus to cause air under pressure to be applied, by way of the chamber 71 and the air connection 64, to the chambered housing 57. Pressure of air in said chambered housing 57 will force the reach rod 56 outwardly and cause the clutch band 44 to be gripped to the clutch drum 40 in the manner as hereinbefore set forth. The drive of said drum will be through the drum shaft 17, the spline 43, the clutch entity 42, the clutch band 44 and the clutch drum 40. The drum 28 will be driven in direction to cause the differential clutch band 95 to be released from the clutch drum 39 in the manner as has been explained so that said differential clutch band 95 will offer no interference to rotation of said drum 28 when rotated to elevate or pull in a load. When it is intended that driving of the drum 28 be terminated, said control lever 148 is operated to position the valve 149 to shut off the air connection 146 from the air connection 72, thus to cause pressure within the chambered housing 57 to be relieved. The clutch band 44 will at once become released from the clutch drum 40 upon relief of pressure within said chambered housing 57 so that the drum 28 will, if under the weight of a load, have tendency to turn in direction opposite the direction in which said drum is driven. Immediately, however, the clutch shoes 105, 106 will rotate in direction causing the differential clutch band 95 to be gripped to the clutch drum 39, and inasmuch as the main or load brake band 76 is normally gripped to the brake ring 75 upon the brake wheel 73, rotation of the drum in direction counter to its driving direction will be terminated substantially concurrently with release of said clutch band 44 from said clutch drum 40. Stated otherwise, said drum 28 will be retained in stationary position against the weight of a load upon release of the clutch entity 42 from the drum by the main or load brake band 76 when set, the brake ring 75, the brake wheel 73, the differential clutch band 95 and the clutch drum 39.

When it is desired that a load be paid out, or lowered, the control lever 148 is operated to position the valve 149 to open the air connection 146 to the air connection 89, thus to cause air under pressure to be applied to the chambered housing 87. Pressure of air in said chambered housing 87 will force the reach rod 86 outwardly and cause the main or load brake band 76 to be released from the brake ring 75 in the manner which has been explained. When it is intended that pay out, or lowering, of the load be terminated, said control lever 148 is operated to position the valve 149 to shut off the air connection 146 from the air connection 89, thus to cause pressure within the chambered housing 87 to be relieved. The main or load brake band 76 will at once become gripped to the brake ring 75 upon relief of pressure within said chambered housing 87, and the drum 28 will, if under the weight of a load, have tendency to continue to turn in paying out, or lowering, direction. The clutch shoes 105, 106, however, will be rotated during pay out, or lowering, of a load in direction to cause the differential clutch band 95 to be gripped to the clutch drum 39. That is to say, the drum 28 will be immediately brought to rest and retained in stationary position against the weight of a load when the main or load brake band 76 is operated from its released to its gripping position upon the brake ring 75 to terminate pay out, or lowering, of the load by reason of the fact that the differential clutch band 95 will have become gripped against the clutch drum 39 while the load was being paid out, or lowered. Actually, in practical operation, the differential clutch band 95 becomes gripped to the clutch drum 39 whenever a load is held by the main or load brake band 76, and paying out, or lowering, operations have tendency to actuate said differential clutch toward its gripping position rather than toward its released position.

When it is intended that the dog 118 be engaged with the ratchet or toothed entity 41 to cause the drum 28 to be retained in stationary position against the weight of a load, the control lever 148 is operated to position the valve 149 to open the air connection 146 to the air connection 144, thus to cause air under pressure to be applied to the chambered housing 142. Pressure of air in said chambered housing 142 will force the reach rod 141 outwardly and cause said dog 118 to be applied to said ratchet or toothed entity 41 in the manner as hereinbefore set forth. Upon operation of said control lever 148 to position the valve 149 to shut off the air connection 146 from the air connection 144 to cause pressure within the chambered housing 142 to be relieved after the dog 118 has been set against the ratchet or toothed entity 41, the reach rod 141 will recede thus to cause the actuator pawl 134 to be returned to normal receded position. When it is intended that the actuating mechanism for the dog 118 be set to permit said dog to be kicked out and clear of the ratchet or toothed entity 41 in response to slight rotation of the drum 28 in load lifting direction, the control lever 148 is also operated to position the valve 149 to open the air connection 146 to the air connection 144, thus to cause air under pressure to be applied at the chambered housing 142 to force the reach rod 141 to move outwardly and advance said actuating mechanism in the manner as hereinbefore explained. Upon operation of said control lever 148 to position the valve 149 to shut off the air connection 146 from the air connection 144 to cause pressure within said chambered housing 142 to be relieved after the actuating mechanism for the dog 118 has been situated to permit kicking of said dog out and clear of said ratchet or toothed entity 41, the reach rod will recede and cause the actuator pawl to be returned to normal receded position.

What is claimed is:

1. In material handling apparatus, the combination with a rotatably supported main drum of a drum braking and clutching mechanism comprising a clutch drum rigid with said main drum, a brake wheel rotatably supported upon said main drum, a brake ring rigid with said brake wheel, a brake band, means for causing said brake band to be engaged with and released from said brake ring, and a differential clutch band supported by said brake wheel and adapted to be engaged with and released from said clutch drum.

2. In material handling apparatus, the combination with a rotatably supported main drum of a drum braking and clutching mechanism comprising a clutch drum rigid with said main drum, a brake wheel rotatably supported upon said main drum, a brake ring rigid with said brake wheel, a brake band, means for actuating said brake band into engaged relation with and released relation from said brake ring, and a differential clutch band in surrounding relation to said clutch drum and having its opposite ends supported upon said brake wheel, said differential clutch band being adapted to grippingly engage said clutch drum in response to rotation of said main drum relative to said brake wheel in one direction and to become released from said clutch drum in response to rotation of said main drum relative to said brake wheel in opposite direction.

3. In material handling apparatus, the combination with a rotatably supported main drum of a drum braking and clutching mechanism comprising a clutch drum rigid with said main drum, a brake wheel rotatably supported upon said main drum, a brake ring rigid with said brake wheel, a brake band in surrounding relation to said brake ring, means for actuating said brake band into engaged relation with and released from said brake ring, a crank having an intermediate portion thereof rotatably mounted upon said brake wheel at the outer side of said clutch drum and including spaced apart, outwardly extending arms, a differential clutch band in surrounding relation to said clutch drum and having its opposite ends connected to the spaced apart arms, respectively, of said crank at unequal distances from the crank mounting, an element rotatably and frictionally supported by said main drum, and a link between said element and an arm of said crank.

4. In material handling apparatus, the combination with a drum shaft and a main drum rotatably supported upon said drum shaft, of mechanism for driving said main drum including a first clutch drum rigid with said main drum, a clutch entity fixed to rotate with said drum shaft and a clutch band supported by said clutch entity in surrounding relation to the first clutch drum and adapted to be engaged with and released from said first clutch drum, a drum braking and clutching mechanism comprising a second clutch drum rigid with said main drum, a brake wheel rotatably supported upon said main drum, a brake ring rigid with said brake wheel, a brake band, means for causing said brake band to be engaged with and released from said brake ring and a differential clutch band supported by said brake wheel and adapted to be engaged with and released from said second clutch drum.

5. In material handling apparatus, the combination with a drum shaft and a main drum rotatably supported upon said drum shaft, of mechanism for driving said main drum including a first clutch drum rigid with said main drum, a clutch entity fixed to rotate with said drum shaft and a clutch band supported by said clutch entity in surrounding relation to the first clutch drum and adapted to be engaged with and released from said first clutch drum, a drum braking and clutching mechanism comprising a second clutch drum rigid with said main drum, a brake wheel rotatably supported upon said main drum, a brake ring rigid with said brake wheel, a brake band, means for actuating said brake band into engaged relation with and released relation from said brake ring and a differential clutch band in surrounding relation to said second clutch drum and having its opposite ends supported upon said brake wheel, said differential clutch band being adapted to grippingly engage said second clutch drum in response to rotation of said main drum relative to said brake wheel in one direction and to become released from said second clutch drum in response to rotation of said main drum relative to said brake wheel in opposite direction.

6. In material handling apparatus, the combination with a drum shaft and a main drum rotatably supported upon said drum shaft, of mechanism for driving said main drum including a first clutch drum rigid with said main drum, a clutch entity fixed to rotate with said drum shaft and a clutch band supported by said clutch entity in surrounding relation to the first clutch drum and adapted to be engaged with and released from said first clutch drum, a drum braking and clutching mechanism comprising a second clutch drum rigid with said main drum, a brake wheel rotatably supported upon said main drum, a brake ring rigid with said brake wheel, a brake band in surrounding relation to said brake ring, means for actuating said brake band into engaged relation with and released relation from said brake ring, a crank having an intermediate portion thereof rotatably mounted upon said brake wheel at the outer side of said second clutch drum and including spaced apart, outwardly extending arms, a differential clutch band in surrounding relation to said second clutch drum and having its opposite ends connected to the spaced apart arms, respectively, of said crank at unequal distances from the crank mounting, an element rotatably and frictionally supported by said main drum and a link between said element and an arm of said crank.

7. The combination as specified in claim 4, a ratchet fixed to rotate with said main drum, and means adapted to be engaged with and disengaged from said ratchet to retain the main drum in stationary position against the weight of a load and release said main drum to said load.

8. The combination as specified in claim 5, a ratchet fixed to rotate with said main drum, and means adapted to be engaged with and disengaged from said ratchet to retain the main drum in stationary position against the weight of a load and release said main drum to said load.

9. The combination as specified in claim 6, a ratchet fixed to rotate with said main drum, and means adapted to be engaged with and disengaged from said ratchet to retain the main drum in stationary position against the weight of a load and release said main drum to said load.

10. In material handling apparatus, a drum to be rotated, first mechanism for driving said drum in a given direction, a brake wheel rotatably mounted on said drum, second mechanism for clutching said brake wheel to said drum when the drum rotates under the weight of a load in direction opposite its driven direction and for unclutching said wheel when said drum is being driven by said first mechanism, third mechanism operable upon said brake wheel for braking said drum and retaining the drum in stationary position against the weight of the load, devices adapted to be hydraulically actuated to control said drum driving, braking and retaining mechanisms, and means adapted to be manipulated at a single location for causing said devices selectively to be actuated.

11. The combination as specified in claim 10, a ratchet fixed to rotate with said drum, and means adapted to be engaged with and disengaged from said ratchet to retain the drum in stationary position against the weight of a load and release said drum to said load.

ROLF E. LJUNGKULL.

REFERENCES CITED

The following references are of record in the file of this patent:

UNITED STATES PATENTS

| Number | Name | Date |
|--------|------|------|
| 53,621 | Hoyt | Apr. 3, 1866 |
| 248,286 | Bruner | Oct. 18, 1881 |
| 312,146 | Merritt | Feb. 10, 1885 |
| 661,070 | Olds | Nov. 6, 1900 |
| 840,223 | Laidlaw et al. | Jan. 1, 1907 |
| 1,298,956 | Johnson | Apr. 1, 1919 |
| 1,707,219 | Cook | Apr. 2, 1929 |
| 1,805,482 | Dyrr | May 19, 1931 |
| 1,864,126 | Ferris | June 21, 1932 |
| 2,185,551 | Glasner | Jan. 2, 1940 |
| 2,366,433 | Bridwell et al. | Jan. 2, 1945 |